United States Patent [19]

Pisano

[11] 4,276,744
[45] Jul. 7, 1981

[54] CONTROL SYSTEM FOR GAS TURBINE ENGINE

[75] Inventor: Alan D. Pisano, Chelsea, Mass.

[73] Assignee: General Electric Company, Cincinnati, Ohio

[21] Appl. No.: 76,890

[22] Filed: Sep. 19, 1979

[51] Int. Cl.³ .................. F02C 3/10; F02C 9/28
[52] U.S. Cl. ................ 60/39.16 R; 60/39.28 P
[58] Field of Search .......... 60/39.16 R, 39.28 P; 244/17.13; 416/33

[56] References Cited

U.S. PATENT DOCUMENTS

| | | | |
|---|---|---|---|
| 2,926,732 | 3/1960 | Chamberlin | 60/39.28 P |
| 2,942,416 | 6/1960 | Buckingham | 60/39.15 |
| 3,034,583 | 5/1962 | Best | 60/39.28 P |
| 3,114,240 | 12/1963 | Howard et al. | 60/39.16 R |
| 3,152,444 | 10/1964 | Pectkowski et al. | 60/39.16 R |
| 3,174,284 | 3/1965 | McCarthy | 60/39.16 R |
| 3,309,868 | 3/1967 | Downing et al. | 60/39.16 R |
| 3,600,888 | 8/1971 | Nethken et al. | 60/39.16 R |
| 3,851,463 | 12/1974 | Robinson | 60/39.16 R |
| 3,982,389 | 9/1976 | Maker | 60/39.16 R |
| 3,999,373 | 12/1976 | Bell et al. | 60/39.16 R |

*Primary Examiner*—Louis J. Casaregola
*Attorney, Agent, or Firm*—Carl L. Silverman; Derek P. Lawrence

[57] ABSTRACT

A gas turbine engine control system is provided. In a preferred control system for use in combination with a helicopter, input signals respectively representative of power turbine speed error, power turbine shaft torque, and compressor shaft speed are employed. From these input signals, five intermediate signals are developed. One of the intermediate signals represents the main rotor speed error. Each of the five intermediate signals is provided with a separate predetermined gain and coupled to summation means. The predetermined gains are selected to be of values which reduce the effects of resonances provided by the mail and tail rotors of the helicopter. The output of the summation means represents a control signal and may be employed to operate a fuel control valve.

6 Claims, 5 Drawing Figures

CONTROL SYSTEM FOR GAS TURBINE ENGINE

The Government has rights in this invention pursuant to Contract No. DAAJ 01-75-C-0360 awarded by the U.S. Army.

BACKGROUND OF THE INVENTION

The present invention relates to gas turbine engines, and more particularly, to a control system for such engines.

Of importance in the control of a gas turbine engine used as a helicopter powerplant is the need to govern the speed of the power turbine. Typically, the speed of the power turbine is desired to be constant under substantially all conditions. Such constant speed governing must be maintained in even the most severe flight maneuvers. Deviation from constant speed, or isochronous operation, is sometimes referred to as "rotor droop." It is known that such "droop" can be reduced by increasing the bandwidth of the speed control through an increase in the loop gain of the speed control system thereby making the control system more responsive to deviations from the desired constant speed. However, it is also well known that this loop gain cannot be increased without causing the control system to become unstable at frequencies indicative of the mechanical resonances of the main rotor system and the tail rotor system. Both of these resonances tend to be very lightly damped as a result of coupling large inertial masses (rotors) to the power turbine through shafts and springs which provide very little damping. Consequently, it is a conventional practice to limit the loop gain of the speed control to a level which keeps the mechanical resonances adequately suppressed and to accept a corresponding compromise in the magnitude of the "rotor droop" which will be tolerated. It is also commonly known that the amplitude and frequency of the main and tail rotor resonances are different on different airframes and that the amplitude of the resonances can vary with flight velocity.

It is, therefore, an object of the present invention to provide an improved control system for a gas turbine engine.

Another object of the present invention is to provide such a control system for use in combination with a powerplant of a helicopter.

Another object of the present invention is to provide such a control system in which mechanical resonances of the main and tail rotors are suppressed, permitting increased control system loop gains with stable control system operation.

Another object of the present invention is to provide such a control system which is adaptable to different airframes.

Another object of the present invention is to provide estimator means for estimating the main rotor speed error in a helicopter.

SUMMARY OF THE INVENTION

In one form of my invention, I provide, in combination with a gas turbine engine having first drive shaft means coupled to engine compressor means and second drive shaft means adapted to provide rotational motion to at least one airfoil, a control system for controlling the rotational speed of the second drive shaft means. The control system is of the type including: means for developing a first signal representative of a desired rotational speed of the second drive shaft means and a second signal representative of the actual rotational speed of the second drive shaft means; means for developing an error signal representative of the difference between the first and second signals; integrator means for integrating the error signal; first gain means for providing a desired gain to the integrated error signal, the integrated error signal comprising a control signal; and including a fuel valve control means responsive to the control signal for controlling the passage of fuel to the engine. The control system further includes: means for developing a third signal representative of the rotational speed of the first drive shaft means; means for developing a fourth signal representative of the torque provided by the second drive shaft means; signal processing means coupled to receive the error signal, the third and fourth signals and to develop a plurality of intermediate signals therefrom; and summing means coupled to receive the plurality of intermediate signals and the output of the first gain means and developing an output signal, the output signal comprising the control signal to the fuel control valve means for controlling the passage of fuel to the engine.

In another form of my invention, I provide estimator means for use in combination with a helicopter powered by a gas turbine engine, the helicopter including a main rotor and a tail rotor coupled to turbine output shaft means. The estimator means includes first signal processing means forming a simplified representation of the main rotor and tail rotor of the helicopter. Second signal processing means is provided and is coupled to receive a first input signal representative of the difference between a desired rotational speed of the output shaft means and the actual rotational speed of the output shaft means and to receive a second input signal representative of the torque at the output shaft means. The second signal processing means includes separate gain means for responsively providing the first and second input signals with predetermined gains. Third signal processing means is provided and couples the second signal processing means to the first signal processing means wherein the first signal processing means is caused to be an actual representation of the main rotor and tail rotor of the helicopter and wherein the output signal of the first signal processing means is representative of the main rotor speed error.

In another form of my invention, I provide a method of providing a speed control system for use in controlling the output drive shaft means of a gas turbine engine of the type employed in powering the airfoils of a helicopter. The method includes the steps of developing five signals representative of: the difference between a desired rotational speed of the output drive shaft means and the actual rotational speed of the output drive shaft means; the integrated difference; the torque at the output drive shaft means; the speed of the compressor drive shaft in the engine; the main rotor speed error. The method includes the step of providing the five signals with predetermined gains which are selected to be of values which reduce the effects of resonances provided by the main and tail rotors.

BRIEF DESCRIPTION OF THE DRAWINGS

While the specification concludes with claims particularly pointing out and distinctly claiming that which is regarded as the present invention, the objects and advantages of this invention can be more readily ascertained from the following description of preferred embodiments, when read in conjunction with the accompanying drawings, in which:

DESCRIPTION OF THE PREFERRED EMBODIMENT

Figure 1:
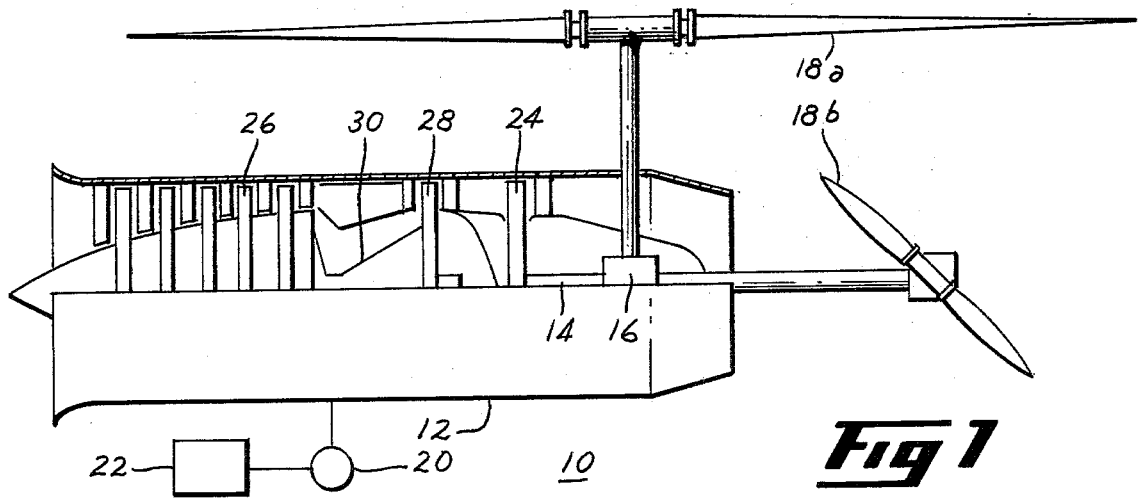
FIG. 1 is a partially broken-away schematic representation of a gas turbine engine system.

Referring initially to FIG. 1, a gas turbine engine system to which the control system of the present invention relates is generally designated 10. The system 10 includes a gas turbine engine 12 of the type known as a turboshaft engine, having an output drive shaft 14, also termed power turbine shaft, capable of rotation. The output drive shaft 14 is coupled to gearbox means 16. The gearbox means 16 is provided to couple output drive shaft 14 to at least one airfoil 18. In FIG. 1, the gearbox 16 is shown coupled to two airfoils, respectively designated 18a, 18b. In FIG. 1, airfoil 18a is intended to represent the main airfoil, or rotor, and airfoil 18b is intended to represent a supplementary, or tail rotor, exemplary of helicopter-type systems. The operation of output shaft 14 of engine 12 is controlled through the use of fuel control valve means 20. The fuel valve control means 20 is in turn controlled by control system 22.

An exemplary construction of one form of turboshaft engine 12 is shown in simplified form in FIG. 1. More particularly, turboshaft engine 12, shown in FIG. 1, includes output shaft means 14 (power turbine shaft) which is driven by free-wheeling turbine element 24. Turboshaft engine 12 further includes compressor means 26 mechanically coupled to a separate turbine element 28 through compressor drive shaft means 30.

Figure 2:
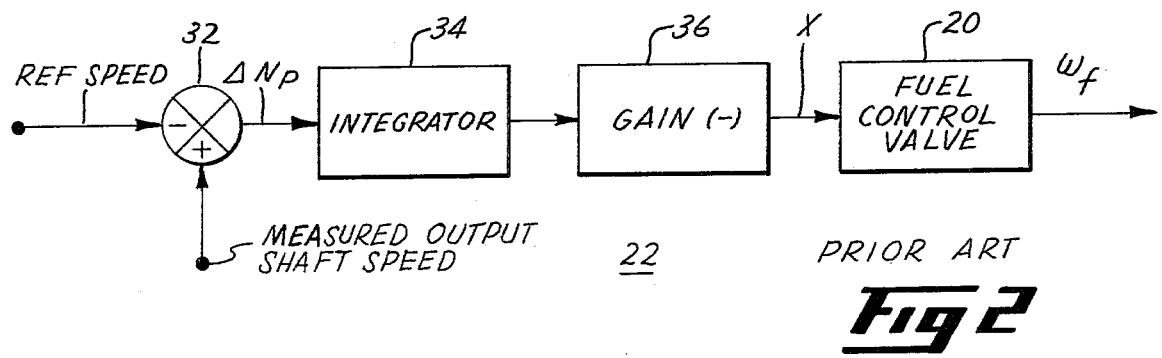
FIG. 2 is a simplified block diagram depicting a prior art control system.

Referring now to FIG. 2, further details of an exemplary prior art control system 22 are shown. More particularly, exemplary control system 22 includes difference means 32 for receiving an input signal representative of the desired or reference speed of the output shaft 14, i.e., power turbine. Difference means 32 also receives an input signal representative of the measured output shaft 14 speed. Difference means 32 then produces an output signal, $\Delta N_p$, representative of the difference between these two inputs, often termed the speed error signal. The speed error signal, $\Delta N_p$, is coupled to an integrator 34 to drive the error to zero over a period of time. The output of the integrator 34 is coupled into gain means 36. The purpose of the gain means 36 is to provide an appropriate negative loop gain so as to make the control system responsive to deviations from the desired constant speed. The output of gain means 36 represents the control signal to the fuel control valve 20. For purposes of convenience, this prior art control signal will sometimes be designated, control signal X. As noted in FIG. 1, the fuel control valve 20 determines the fuel flow $W_f$.

Figure 3:
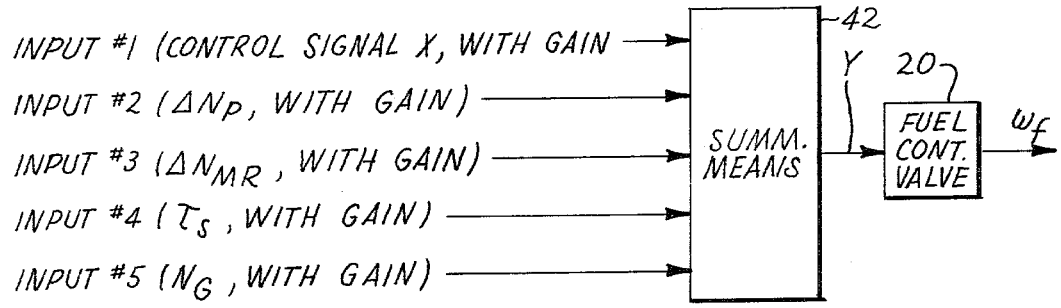
FIG. 3 is a functional block diagram of a portion of one form of control system of the present invention.

Referring now to FIG. 3, a portion of one form of the control system of the present invention is generally designated 40. The control system 40 includes fuel control valve means 20, such as the one shown in FIGS. 1 and 2. For purposes of clarity, the control signal of the present invention will sometimes be referred to as control signal Y, as distinguished from control signal X of FIG. 1-2. In this connection, control signal Y of the control system 40 is provided, by a modification to control signal X, and through the summation of four additional input signals. More particularly, summation means 42 is provided to receive the following five input signals:

Input signal No. 1, representing control signal X of FIG. 1 with a predetermined gain;

Input signal No. 2, representing the error signal, $\Delta N_p$, with a predetermined gain;

Input signal No. 3, representing the main rotor 18a speed error, $\Delta N_{mr}$, with a predetermined gain;

Input signal No. 4, representing the torque, $\tau_s$, at the output shaft 14 (power turbine) with a predetermined gain;

Input signal No. 5, representing the speed of compressor shaft 30, $N_G$, with a predetermined gain.

Figure 4:
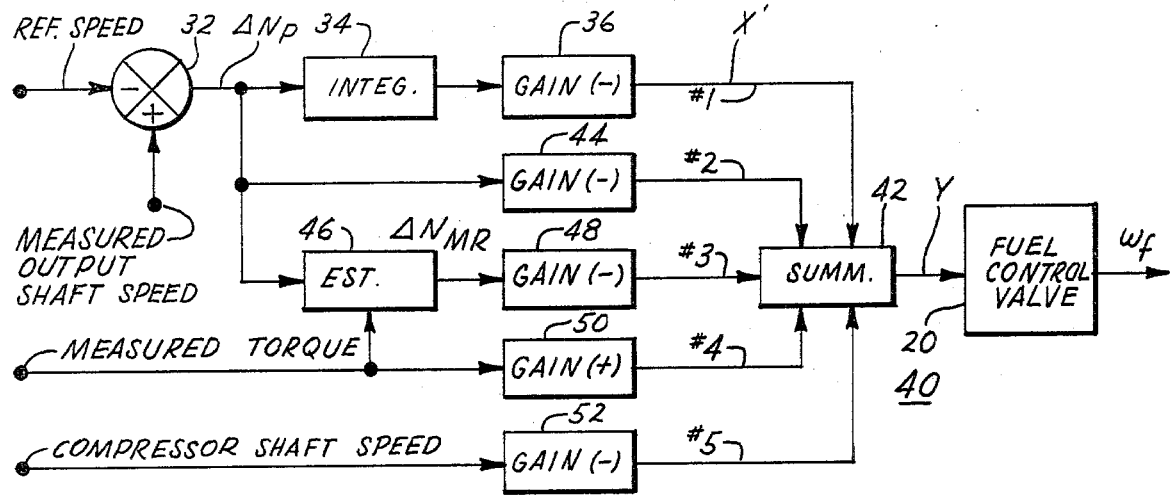
FIG. 4 is a functional block diagram of one form of control system of the present invention.

Referring now to FIG. 4, the manner in which the five input signals of the control system 40 of FIG. 3 are obtained is shown. More particularly, as in FIG. 2, a reference speed signal and a measured output shaft 14 speed signal are directed to difference means 32. Difference means 32 develops an error signal, $\Delta N_p$. Error signal $\Delta N_p$ is directed toward integrator 34 having an output coupled to gain means 36. Thus, the output signal (signal X') of gain means 36 of FIG. 4 is substantially the same as control signal X of FIG. 2. However, as will be discussed later, in accordance with the present invention, signal X' is provided with a predetermined gain through gain means 36. The output signal of gain means 36 is coupled to summation means 42. Error signal $\Delta N_p$ is also coupled separately to summation means 42 through gain means 44. Error signal $\Delta N_p$ is also separately coupled to estimator means 46. Estimator means 46 receives a second input signal thereto which is representative of the measured torque, $\tau_s$, of the output shaft 14. As will be discussed more fully later, estimator means 46 processes these two input signals and develops an output signal, $\Delta N_{mr}$, which is representative of the actual rotational speed of the main rotor 18a with respect to the power turbine reference speed. Thus, output signal $\Delta N_{mr}$ is representative of the main rotor 18a speed error. By the term, actual rotational speed of the rotor 18a, it is meant the average speed of the airfoil blade tips, in rpm. It is to be noted that such speed is commonly not possible to measure directly. The main rotor error signal $\Delta N_{mr}$ is coupled to summation means 42 through gain means 48. The signal representative of the measured torque at the output shaft 14 is also separately coupled to summation 42 through gain means 50. Another signal representative of the compressor shaft 30 speed, $N_G$, is coupled to summation means 42 through gain means 52.

It is to be appreciated that the control system 40 of the present invention employs as its input signals, signals which are readily available and/or measurable, i.e., reference speed, output shaft speed, measured torque, and compressor shaft speed. Similarly, the functional blocks shown in FIG. 4 are well known and commercially available.

Generally, in one form of the control system 40 of the present invention, the predetermined gains separately provided by gain means 36, 44, 48, 50, and 52 are selected to be of values which reduce the undesirable effects of the mechanical resonances of the main and tail rotor systems while such values also permit the loop gain of the control system to be increased to a level which would otherwise have caused the control system to become unstable as a result of such resonances. An exemplary technique for determining such predetermined gains will be discussed more fully later.

The operation of the control system 40 of FIG. 4 will now be generally described in connection with a commanded increase in power by the operator, i.e., the pilot. As a result of such commanded change, the signal representative of measured torque increases. At this point, the speed error signal $\Delta N_p$ increases in a negative direction but, due to the high inertia in the rotor system, this increase is delayed with respect to the increase in the measured torque signal. Gain means 50 is set at a positive value such that an increase in measured torque results in an increase in fuel flow. Error signal $\Delta N_p$ and the main rotor speed error, $\Delta N_{mr}$, both increase negatively with increasing power demand. Gain means 44 and 48 are set with negative gains such that they also command an increase in fuel flow. The increase in the signal representative of the compressor shaft 30 speed, when processed through negatively set gain means 52, will be in the direction to reduce fuel flow but will be exceeded by the signals which will increase fuel flow. As in FIG. 2, integrator means 34 functions to prevent the fuel flow from settling to a constant until the speed error signal, $\Delta N_p$, is precisely zero.

For one exemplary helicopter application, the following exemplary predetermined gains, in FIG. 4, have been found to be preferable:

Gain means 36=0.0596
Gain means 44=0.005
Gain means 48=0.0201
Gain means 50= +0.00083
Gain means 52= −0.25

The setting of gain means 50 (positive gain) such that an increase in measured torque produces an increase in fuel flow is highly desirable in connection with the well known helicopter maneuver known as "recovering from autorotation." During such autorotation, the rotor is decoupled from the power turbine as its speed is above the referenced value. When the rotor subsequently slows down to the power turbine speed reference, it engages the output shaft with a significant increase in torque. This increase in torque commands an immediate increase in fuel flow which greatly reduces the amount of rotor droop which would have otherwise occurred if such torque signal were not present.

It is to be further appreciated that the measured torque signal and measured output shaft speed signal each contain information about the main and tail rotor resonances. As this information differs in amplitude and phase in each such signal, such signals can be dynamically combined by the control system of the present invention to effectively suppress or cancel such resonances. It is to be noted that, if the resonances should shift, either because of flight velocity or because the control system is installed on another or different airframe, the signal content in each of the torque and output shaft speed signals will shift correspondingly. Therefore, the control system of the present invention produces an output signal which is fairly insensitive to changes in the resonances and is therefore adaptable for use on different airframes.

Figure 5:
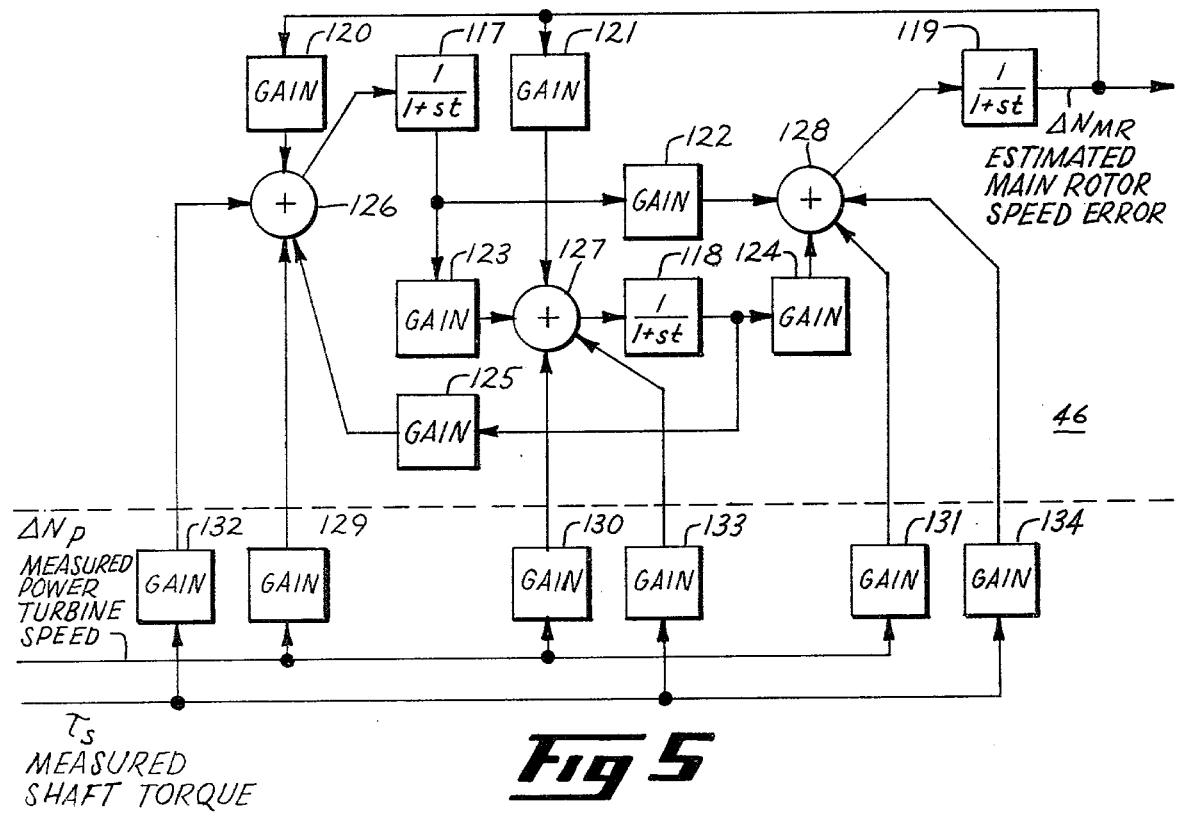
FIG. 5 is a functional block diagram of one form of the estimator means of the present invention.

Referring now to FIG. 5, a more detailed diagram of one form of estimator means 46 of the present invention is shown. The estimator means 46 receives two input signals: error signal $\Delta N_p$ and a signal $\tau_s$ representative of the measured shaft torque. From these two input signals, the estimator means 46 develops an output error signal, $\Delta N_{mr}$, representative of the actual main rotor speed, i.e., average speed of the blade tips.

Blocks 117, 118, and 119 are first-order linear dynamic elements with time constant t. These first-order linear dynamic elements, 117, 118, 119, in combination with gain means 120-125, form a simplified representation of the main and tail rotors of the particular helicopter involved. Three summation devices, 126, 127, 128, receive the measured error signal $\Delta N_p$ and shaft torque input signal $\tau_s$ through gain means 129, 130, 131, and through gain means 132, 133, 134, respectively. The addition of such shaft torque and error signals through summation means 126, 127, 128, causes the simplified rotor representation provided by elements 117, 118, 119 and gain means 120–125 to be an actual representation of the involved airframe, i.e., helicopter structure. More particularly, the output of the first-order linear dynamic element means 119 is representative of an estimate of the actual main rotor speed error. The estimate, $\Delta N_{mr}$, is correct both in amplitude and in true phase relationship with the actual rotor speed error.

GENERAL CONSIDERATIONS

Referring again to FIG. 4, gain means 36, 44, 48, 50, 52, can be determined using "Linear Quadratic Regulator Theory." This theory is well known to those skilled in the art of Modern Control Theory and is discussed in, *Linear Optimal Control Systems*, Kwakernaak H and Sivan R, Wiley-Interscience, New York, 1972. Generally, this theory requires a set of equations, including matrices, which describe the dynamic behavior of the aircraft engine and rotor system as well as the resonances therein. A set of weighting matrices is provided to characterize the desired accuracy to be achieved by the design. By adjusting the elements in the weighting matrices, it is possible to suppress the effects of the resonances in the engine and rotor system and, therefore, permit a greatly increased bandwidth while at the same time providing for increased stability. More particularly, a set of gains can be calculated from well known equations such as found in the previously mentioned reference and in computer programs such as those discussed in *Manual of FORTRAN Computer Subroutines for Linear, Quadratic, Gaussion Designs*, Sandell N and Athans M, Center for Advanced Engineering Study, MIT, 1974. These gains can then be employed to suppress the resonances.

The estimator means 46 may be constructed in accordance with the well known Linear Observer Theory. Generally, this theory provides a technique for estimating signals through knowledge of information contained in other measurable signals. General equations useful in devising such an estimator means 46 can be found in the previously mentioned reference, *Linear Optimal Control Systems*. To evolve the simplified rotor representation of estimator means 46, as represented by elements 117 through 128 of FIG. 5, the following information is necessary and generally available: the inertia of the torsional masses in the airfoils, spring constants of the shafts, and damping constants. Utilizing such information, one can develop a set of equations describing the dynamics necessary to design such an estimator and then design such an estimator in accordance therewith.

Techniques for use in connection with the control system of the present invention may be better appreciated by the following example: it being understood that the present invention is not limited to the details recited therein.

EXAMPLE

For the purpose of this example, consider all speeds to be measured in radians per second, all torques to be measured in foot-pounds and fuel flow to be measured in pounds per hour. Accordingly, all gains developed hereinafter in this example are based on such units.

Step 1: Construct a normalized linear state-variable model of the specific turboshaft engine and rotor system including those dynamics important to control. (All variables are perturbations from nominal.)

$$\dot{x} = Ax + Bu$$

where
vector $x = \begin{bmatrix} N_p = \text{power turbine speed} \\ \tau_s = \text{shaft torque} \\ N_{mr} = \text{main rotor speed} \\ N_G = \text{compressor turbine speed} \\ W_f = \text{fuel flow} \end{bmatrix}$ vector $u = [W_f = \text{rate of change of fuel flow}]$ For a specific system, the A and B matrices are given by $$A = \begin{bmatrix} -1.54 & -7.49 & 0 & 236. & 1110. \\ 46.2 & -.231 & -46.2 & 6.23 & 29.3 \\ 0 & 1.25 & -.342 & 0 & 0 \\ 0 & 0 & 0 & -.815 & 23.9 \\ 0 & 0 & 0 & 0 & 0 \end{bmatrix}$$

$$B = \begin{bmatrix} 0 \\ 0 \\ 0 \\ 0 \\ 1.0 \end{bmatrix}$$

Step 2: Form a quadratic measure of performance of the form:

$$J = \lim_{t_f - t_0 \to \infty} \int_{t_0}^{t_f} (x^T Q x + u^T R u) \, dt$$

where $x^T$ and $u^T$ represent the matrix transpose of x and u, respectively.

For the specific system, the Q and R matrices are given by $$Q = \begin{bmatrix} .002 & 0 & 0 & 0 & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 31.8 \end{bmatrix} \quad R = [0.569]$$

Step 3: Using the information of Steps 1 and 2, provide and solve the Riccati equation using standard computer programs to generate the state feedback gains.

$$U = +Gx$$

For the specific system, considered here $$G = [-0.0137, +0.01204, -0.0314, -0.970, -11.51]$$

Step 4: Transform the feedback gains of Step 3 to a new system where the state variables are now given by $$x^* = \begin{bmatrix} N_p \\ \tau_s \\ N_{mr} \\ N_G \\ \int N_p \end{bmatrix} \quad u^* = [W_f]$$

where
$\int N_p = $ integral of $N_p$
The feedback gains in the transformed system are now $$u^* = +Hx^*$$

It is well known that $$H = G \begin{bmatrix} A & B \\ E & O \end{bmatrix}^{-1}$$

Where A, B, E, and O are separate matrices and E = [1, 0, 0, 0]
For the specific system:

$$H = [-0.005, +0.00083, -0.0201, -0.25, -0.0596]$$

It is to be appreciated that these gains represent the exemplary gains as discussed hereinbefore in connection with FIG. 4: gain 36 of $-0.0596$; gain 44 of $-0.005$; gain 48 of $-0.0201$; gain 50 of $+0.00083$; gain 52 of $-0.25$.

Step 5: Construct a new normalized linear state variable model which contains the dynamics necessary to design an estimator for $N_{mr}$.

$$\dot{x}' = A'x' + B'u'$$

where $$x' = \begin{bmatrix} N_p \\ N_{mr} \\ N_{TR} = \text{speed of the tail rotor} \\ \tau_s \\ \tau_{mr} - \tau_{TR} = \text{torque difference between main and tail rotors} \\ N_G \end{bmatrix}$$

and $$u' = [W_f]$$

For the specific system, typical A' and B' matrices are given by $$A' = \begin{bmatrix} -1.64 & 0 & 0 & -8.0 & 0 & 252. \\ 0 & -.342 & 0 & .626 & .626 & 0 \\ 0 & 0 & -.906 & 15.6 & -15.6 & 0 \\ 154. & -46.2 & -108. & -1.07 & .540 & 15.6 \\ -61.8 & -46.2 & 108. & .613 & -.573 & -2.32 \\ 0 & 0 & 0 & 0 & 0 & -.815 \end{bmatrix}$$

$$B = \begin{bmatrix} 1185. \\ 0 \\ 0 \\ 73.5 \\ -10.9 \\ 23.9 \end{bmatrix}$$

Step 6: In the formulation of Step 5 only three quantities ($N_p$, $N_G$, $\tau_s$) are measurable. An estimator is designed using the data of Step 5 and well known computer programs. It is also necessary to specify the eigenvalues ("time-constants") of the estimator.

Denoting the best estimate of $N_{mr}$ as $\hat{N}_{mr}$, the equations for the estimator are given by $$\dot{q} = Mq + Nu''$$

where $u'' = \begin{bmatrix} N_p \\ \tau_s \end{bmatrix}$ and $$\hat{N}_{mr} = [1, 0, 0]q + Tu''$$

For the specific system, utilizing the $A'$ and $B'$ matrices of Step 5, choosing the three eigenvalues to each be equal to $-4.0$, and further transforming such that the diagonal elements of M are all equal, yields:

$$M = \begin{bmatrix} -4.0 & -11.7 & 15.5 \\ -.878 & -4.0 & 3.73 \\ -2.87 & 9.18 & -4.0 \end{bmatrix} \quad N = \begin{bmatrix} -.572 & -.044 \\ -.141 & -.312 \\ 3.92 & .631 \end{bmatrix}$$

$$T = [1.08, -0.273]$$

It is to be appreciated that the results of Step 6 are employed in connection with the determination of all gains discussed hereinbefore with reference to FIG. 5.

Step 7: The completed control consists of the gains calculated in Step 4 and the estimator designed in Step 6.

Step 8: The gains based on "normalized" parameters may be scaled to be compatible with the actual units of the measured signals.

After such "unnormalization" and implementing the estimator of Step 6 with first-order linear dynamic elements yields the configuration of FIGS. 5.

While the present invention has been described with reference to specific embodiments thereof, it will be obvious to those skilled in the art that various changes and modifications may be made without departing from the invention in its broader aspects. It is contemplated in the appended claims to cover all such variations and modifications of the invention which come within the true spirit and scope of my invention.

I claim:

1. In combination with a gas turbine engine having first drive shaft means coupled to engine compressor means and second drive shaft means adapted to provide rotational motion to at least one airfoil, a control system for controlling the rotational speed of the second drive shaft means, the control system being of the type including means for developing a first signal representative of a desired rotational speed of the second drive shaft means and a second signal representative of the actual rotational speed of the second drive shaft means, means for developing an error signal representative of the difference between said first and second signals, integrator means for integrating the error signal, first gain means for providing a desired gain to the integrated error signal, the integrated error signal comprising a control signal, and including a fuel valve control means responsive to the control signal for controlling the passage of fuel to the engine, wherein the control system further comprises:

(a) means for developing a third signal representative of the rotational speed of said first drive shaft means;
    (b) means for developing a fourth signal representative of the torque provided by said second drive shaft means;
    (c) signal processing means coupled to receive the error signal, said third and fourth signals and to develop a plurality of intermediate signals therefrom; and
    (d) summing means coupled to receive said plurality of intermediate signals and the output of the first gain means and developing an output signal, said output signal comprising the control signal to said fuel valve control means for controlling the passage of fuel to said engine.

2. A control system in accordance with claim 1 in which said airfoil is characterized by a multiplicity of lightly damped resonances.

3. A control system in accordance with claim 1 in which said gas turbine engine comprises an engine for a helicopter and in which said second drive shaft means is adapted to provide rotational motion to a main rotor and to a tail rotor.

4. A control system in accordance with claim 3 in which the first gain means provides a predetermined gain and said signal processing means includes gain means for providing said error signal, said third signal, and said fourth signal with predetermined gains for reducing the effects of mechanical resonances associated with said main rotor and said tail rotor.

5. A control system in accordance with claim 4 in which said signal processing means includes estimator means for receiving said error signal and said fourth signal and developing a first intermediate signal therefrom, said first intermediate signal being representative of the main rotor speed error.

6. A control system in accordance with claim 5 in which said signal processing means comprises:

(a) second gain means coupled to receive said error signal and to develop a second one of said intermediate signals;
    (b) third gain means coupled to receive said first intermediate signal and to develop a third one of said intermediate signals;
    (c) fourth gain means coupled to receive said fourth signal and to develop a fourth one of said intermediate signals;
    (d) fifth gain means coupled to receive said third signal and to develop a fifth one of said intermediate signals; and
    (e) said summing means coupled to receive the output of the first gain means, said second intermediate signal, said third intermediate signal, said fourth intermediate signal, and said fifth intermediate signal, and developing said control signal.

* * * * *